United States Patent

[11] 3,625,584

[72] Inventor Daniel S. St. John
     Hockessin, Del.
[21] Appl. No. 1,603
[22] Filed Jan. 9, 1970
[45] Patented Dec. 7, 1971
[73] Assignee Holotron Corporation

[54] THREE DIMENSIONAL LARGE SCREEN MOVIE TECHNIQUES EMPLOYING HOLOGRAPHY AND A CYLINDRICAL OPTICAL SYSTEM
25 Claims, 17 Drawing Figs.

[52] U.S. Cl. .................................................. 350/3.5,
     350/127, 350/188, 352/85
[51] Int. Cl. ....................................................... G02b 27/00,
     G03b 35/00, G03b 41/00
[50] Field of Search ............................................ 350/3.5,
     162 SF, 127, 128; 178/6.5, 6.8; 352/85, 86

[56] References Cited
UNITED STATES PATENTS
3,498,690  3/1970  Tyler .............................. 350/3.5
3,514,177  5/1970  Lohmann ........................ 350/3.5

OTHER REFERENCES
Kock et al, Proc. of the IEEE, Jan. 1967, pp. 79–81
De Bitetto, Applied Optics, Vol. 8, No. 8, Aug. 1969, pp. 1740–1741

Primary Examiner—David Schonberg
Assistant Examiner—R. J. Stern
Attorney—Woodcock, Washburn, Kurtz and Mackiewicz ABSTRACT: Holographic information-processing techniques which result in a hologram being formed on photosensitive material capable of reconstructing an image in real space many times the size of the hologram. Horizontal and vertical information components of an object scene to be holographically recorded are treated independently of each other. The horizontal informational component is reduced by an optical system and recorded across a long dimension of a rectangular hologram. In a preferred form of the invention, the horizontal informational component is dispersed prior to holographic recordation in order to reduce the bandwidth of said information. Except for the possible use of light-gathering optics, the vertical informational component of an object scene to be recorded along the narrow dimension of the hologram is not processed. Successive holograms so constructed are placed on a film and drawn across their narrow direction through a shutterless continuous wave coherent light beam to reconstruct in real space successive images that appear to a theater audience to form continuous action. The horizontal information component is displayed in full three dimensions while the vertical information is projected with limited three dimensionality to each member of the audience from the hologram through a lenticular screen.

THREE DIMENSIONAL LARGE SCREEN MOVIE TECHNIQUES EMPLOYING HOLOGRAPHY AND A CYLINDRICAL OPTICAL SYSTEM

BACKGROUND OF THE INVENTION

This invention relates generally to improvements in the techniques of optical holography and more specifically to improved holographic techniques for recording and reconstructing three-dimensional theater size and quality moving pictures.

Off-axis holography is described generally by Leith and Upatnieks in the *Scientific American* June, 1965, pages 25–35, and in their copending patent application Ser. No. 361,977, filed Apr. 23, 1964, issued Apr. 14, 1970 as U.S. Pat. No. 3,506,327. Briefly described, the general technique of off-axis holography includes directing a coherent light beam toward an object and thence as an object-modified beam onto a photosensitive holographic detector such as photographic film. A reference beam coherent with the object-illuminating beam is also directed at the photosensitive detector at some finite angle with the object-modified beam for interference therewith at the hologram detector. Recorded on the detector is an interference pattern which carries both phase and intensity information of the object-modified light beam wave front. When illuminated with a coherent light beam similar to the reference beam used during its construction, at least one first order beam is diffracted by the hologram interference pattern that carries an image of the object in full three dimensions which may be viewed by an observer positioning himself within the diffracted beam.

It has naturally been suggested that these techniques of holography may be utilized to make a movie capable of reconstructing a large screen theater size moving picture in full three dimensions which may be viewed without the aid of Polaroid glasses or some other apparatus. However, use of these basic holographic techniques along to construct such a movie present enormous technical problems. Primarily, the size of each hologram frame of a multihologram movie must be larger than the reconstructed image size desired in order to provide the large viewing angle necessary for good three-dimensional reconstruction.

There have recently been certain advances in holographic data reduction techniques which allows reducing the size of each individual hologram without reducing the size of the reconstructed image or its viewing angle. One such technique utilizes a dispersion medium in the object-modified beam between the object and the photosensitive detector during the construction of a hologram. This is described by Kenneth A. Haines in the *Proceedings of the IEEE*, Aug. 1967, pages 1,512–1,513, in *Applied Optics*, Vol. 7, pages 1,185–1,189, June 1968) as well as in a copending patent application Ser. No. 809,171, filed Mar. 21, 1969, and another copending application Ser. No. 875,768 filed on Nov. 12, 1969. Such data reduction without loss of image size or viewing angle is accomplished at the expense of decreased image resolution or increased noise or both.

The data reduction techniques described therein do not allow reduction of the hologram size sufficiently in all directions to make practical a large screen movie of a significant length. Therefore, it is a primary object of this invention to provide a method and apparatus for additionally reducing the size of a hologram.

Among other objects of the present invention is to provide a holographic movie technique capable of reconstructing a continuous image for viewing by an audience of many people with a three-dimensional representation of the object scene holographically recorded.

SUMMARY OF THE INVENTION

These and additional objects are accomplished by the improved techniques according to this invention which include constructing a hologram and reconstructing an image therefrom by treating the vertical aspect of an object scene independently of its horizontal aspect. In constructing a hologram according to this invention, information of the horizontal aspect of an object scene recorded is compressed into a hologram aperture having a horizontal dimension much less than the horizontal extent of the object scene recorded and the image thereof to be eventually reconstructed from the hologram.

Two techniques are alternatively utilized for providing this information reduction of the horizontal aspects of the object-modified light beam without loss of the reconstructed-image viewing angle. (The term "viewing angle" as used herein refers to the angular extent, as subtended from a reconstructed image of an object, of positions from which substantially all of the image may be viewed.) One of these techniques utilizes cylindrical optics to compress the horizontal component of an object-modified light beam into the hologram aperture in the nature of a horizontally focused image hologram. A second technique combines such horizontal light gathering with dispersion of the object-modified light beam rays in horizontal planes by use of a two-dimensional dispersion medium placed therein. The second technique has an important advantage over the first technique in allowing the horizontal dimension of the hologram aperture to be additionally reduced while maintaining a wide horizontal reconstructed image-carrying beam angle for covering a large area and thereby playing to a large number of people.

Information of the vertical aspect of the object scene is recorded according to ordinary techniques of holography without data reduction. Even without data reduction, the vertical dimension of the halogram aperture is very small with respect to the vertical dimension of the object scene being recorded and many times smaller than the horizontal dimension of the hologram aperture. The field of view of the reconstructed image in the vertical direction is sacrificed by the extremely small vertical hologram dimension used without information reduction. However, sacrifice of the three-dimensional informational content is of little consequence because of the horizontal orientation of the human eyes wherein depth is perceived primarily in the horizontal component of the image, anyway. To produce a wide vertical reconstructed beam angle for projecting the two dimensional vertical image aspect over a large area, light diffracted by a hologram is dispersed in vertical planes by a dispersion medium, such as a lenticular screen, placed within a reconstructed image. The very small vertical dimension of the hologram aperture which results from sacrificing the three-dimensional information of the vertical aspects of the object scene further makes it much easier to produce and reconstruct a holographic movie wherein an individual hologram frame is constructed of an object scene every small fraction of a second. The film area required to store movie information is reduced to within manageable proportions. Also, an image is reconstructed which does not significantly move as the hologram moves relative to its reconstructing light beam.

These techniques are applied to construction of a holographic movie by recording the object scene several times each second upon individual holograms preferably with the use of a pulsed laser synchronized with a film advance. Either the cylindrical optics or the combined cylindrical optics and a horizontal dispersion medium are included in an apparatus for making such a movie. When a master copy is completed, a plurality of copies are made by reconstructing an image from the master movie through the same cylindrical optics and/or dispersion mediums utilized in its construction, thereby to eliminate the effect of any aberrations in these optical elements. An image reconstructed in real space from each frame of the master movie is pseudoscopic; that is, the image appears to be wrong side out. A copy hologram is made of this image as its object in the same way as the master movie was made and using additional cylindrical optics and perhaps a horizontal dispersion medium. Images reconstructed in real space from the copy movies are orthoscopic; that is, the image looks to the observer as if he were observing the object scene itself.

A copy holographic movie is reconstructed in a theater by a laser source that generates an effectively continuous wave coherent beam through which the movie is driven at a uniform speed. By "effectively" continuous is meant herein a laser beam that appears to an observer to be continuous; this may be a continuous wave or a rapidly pulsed beam. It is not necessary to pulse the laser or use shutters or in any other way synchronize the film-illuminating system in a frame by frame exposure. By recording information on the hologram with its vertical aspect unfocused, reconstructed images will move only an amount as maximum which is equal to the vertical dimension of each hologram. Since this dimension is very small compared to the image size, the motion is generally not observed by the audience. To add stability to the reconstructed image with such continuous film motion, the reference beam used in constructing the copy movie is given a radius of curvature so that it appears to come from a point source located a distance from the hologram detector that is substantially equal to the distance of points within an image of an object scene being copied and the hologram detector.

In front of the copy film during its reconstruction and in the path of an image-carrying diffracted beam is placed the same cylindrical optics, or the combination cylindrical optics and a dispersion medium, which were used to construct the copy movie. A full sized image of the object is reconstructed in the horizontal direction with full three dimensionality. The vertical information passes through the horizontal optics without modification and is spread out to be observable to all members of an audience by a lenticular screen which is oriented in a manner not to affect the horizontal information of the object scene.

If it is not desired to reconstruct a full sized image of the object scene, the object scene may be reduced by ordinary high quality spherical optics and this reduced image used as the object of the hologram movie.

These general aspects of the present invention as well as additional aspects and details thereof may be better understood with reference to the following description taken in conjunction with the drawings.

BRIEF DESCRIPTION OF THE DRAWINGS

FIG. 1A shows an elevation view of the movie theater reconstruction of FIG. 1;

DESCRIPTION OF THE PREFERRED EMBODIMENTS

Figure 1:
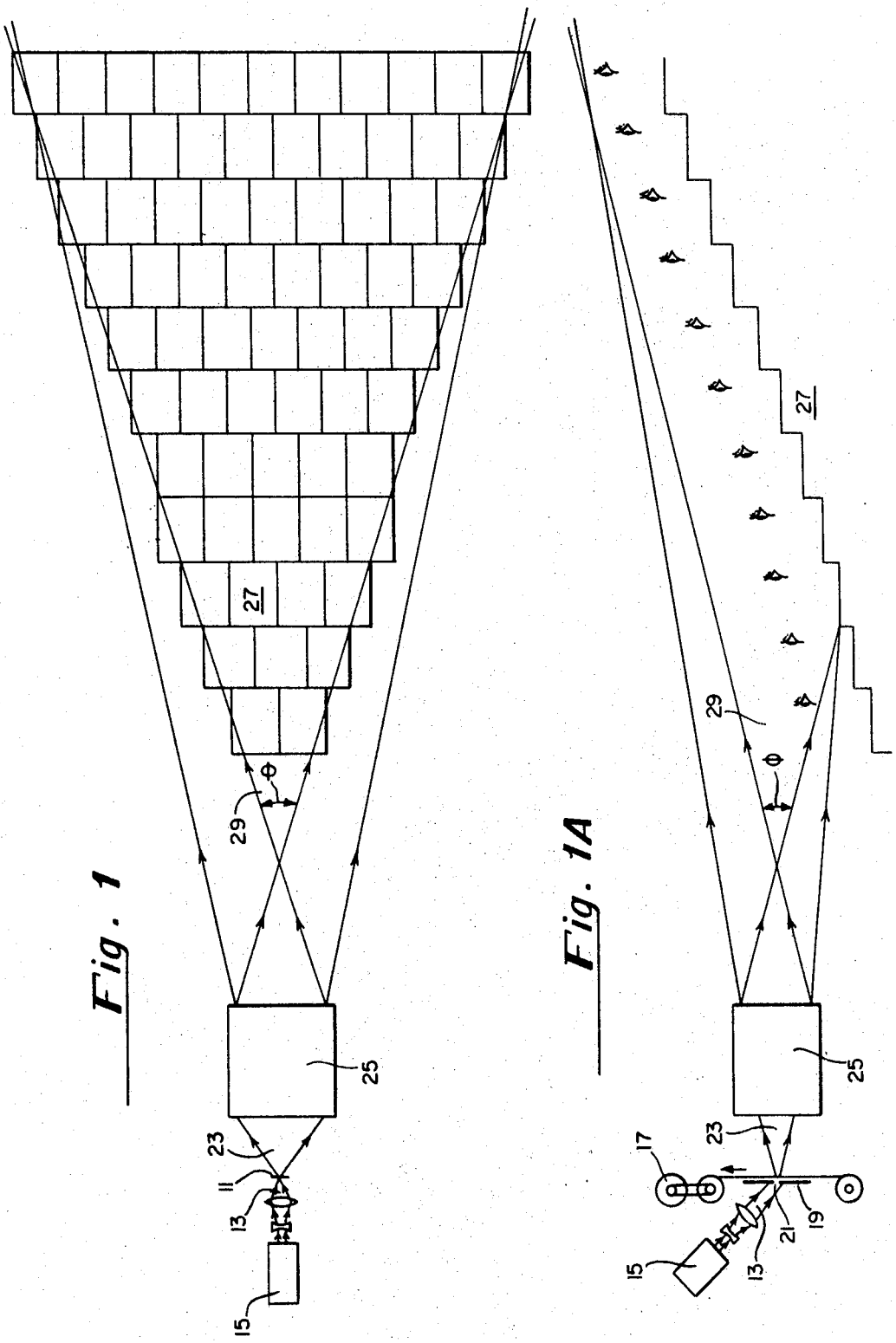
FIG. 1 illustrates reconstruction of a holographic movie according to this invention in a plan view of a theater.

To illustrate the projection requirements contemplated for a holographic movie according to the present invention, a projection system in a theater is shown in plan view in FIG. 1 and in elevation view in FIG. 1A. A holographic movie film 11 is drawn through a coherent illumination beam 13 which is generated by an effectively continuous wave laser 15. Appropriate optical elements give the coherent light beam 13 the proper light wave front curvature, as discussed hereinafter with respect to specific examples. The holographic movie 11 is drawn at a continuous speed from a supply reel to a takeup reel by an appropriate motor source 17. A mask 19 having an aperture 21 of an area approximately equal to that of each individual hologram blocks a portion of the light beam 13. Each hologram diffracts a portion of the incident light into an image-carrying diffracted first order bean 23. The holographic movie contains a separate hologram for each image to be reconstructed and contains enough holograms to reconstruct a large enough number of distinct images per unit time to give the visual effect of an image with continuous motion. It should be noted, however, that no shutter is required for playing the holographic movie nor is any other device necessary to interrupt the light or cause the holographic movie to move intermittently, thus simplifying the reprojecting equipment.

The image-carrying diffracted first order beam 23 is processed by an appropriate optical system 25, specific examples of which are described hereinafter. A number of theater seats, such as the seat 27, are provided for a movie viewing audience. The number of seats that may be provided and their arrangement depend upon the size of the reconstructed image and also upon horizontal beam spread angle $\theta$ of the reconstructed image-carrying diffracted beam 29. To view the entire movie image, all persons must sit within the area of the diffracted beam 29 within which light is diffracted from every exit point of the optical system 25. In the vertical direction, there must be a beam spread angle of $\theta$ of the reconstructed image-carrying diffracted beam 29 so that all persons sitting at various elevations may also see the entire vertical extent of the image. The laser 15 emits light of a single color chosen to be within a range acceptable for extended viewing.

Figure 2:
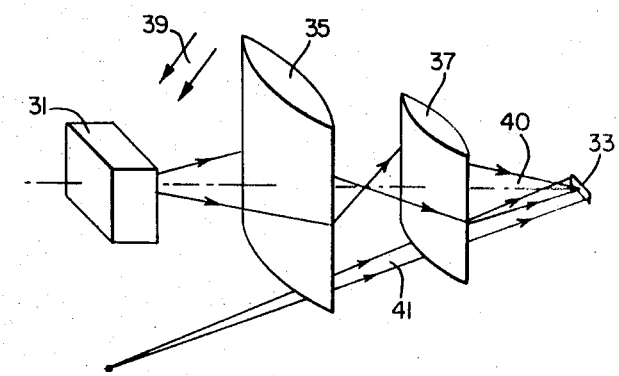
FIG. 2 illustrates the construction of a hologram according to one aspect of the present invention.

To make a holographic movie, a succession of individual holograms is constructed on an appropriate photosensitive detector, each hologram recording the object scene at an exclusive point in time. The techniques of this invention are not, however, limited to construction of a movie but also include certain novel individual hologram construction techniques of wide application. FIG. 2 shows a method of constructing a single hologram frame of the holographic movie according to one aspect of the present invention. Information of an object 31 is to be recorded on a photosensitive holographic detector within the hologram aperture 33. The hologram aperture 33 is very much smaller than the object 31 so in order to construct a hologram capable of reconstructing a full size image without loss of viewing angle in the horizontal direction, information of the horizontal aspect of the object 31 is reduced into the hologram aperture 33 by a cylindrical optical system which may include, for example, two wide aperture cylindrical lenses 35 and 37. A temporally coherent light beam 39 from an appropriate laser source is reflected from the object 31 and its horizontal aspects are imaged into the hologram aperture 33. A reference beam 41 of coherent light is also directed against the hologram aperture 33 to form an interference pattern upon intersection with spatially reduced object-modified radiation 40 reflected from the object 31 for recordation by the hologram detector. A photosensitive hologram detector is preferably high-resolution silver emulsion photographic film.

It should be noted that the cylindrical optical elements 35 and 37 must be of very large aperture in order to gather enough light for holographic construction and also in order to give a hologram capable of reconstructing an image of the object with a wide viewing angle. Additionally, exactly two cylindrical optical elements is not necessarily the optimum arrangement since any particular design will depend upon all the specific circumstances of a given application. What is important, according to this aspect of the invention, is that cylindrical optics focus only the horizontal aspect of the information of the object 31 onto the hologram aperture 33 and allow the vertical information to pass onto the aperture without significant alteration.

To reconstruct an image from a hologram after exposure and appropriate processing of the hologram detector, it is illuminated with coherent light. An image-carrying beam is diffracted by the hologram and directed back through the same cylindrical optics used during its construction. However, an image so reconstructed in real space will be pseudoscopic which is often undesirable for holographic movies of most subject matter types. Since copies of the hologram constructed of the object are generally desired anyway, it is preferable to effect a conversion of the pseudoscopic image into an orthoscopic one in a copying step such as that illustrated in FIG. 3. The original hologram 33' is illuminated with a reconstructing coherent light beam 41' which has a curvature opposite to that of the reference beam 41 used in constructing the hologram. The beam 41' strikes the hologram from its opposite side. The zero-order or undiffracted light 43 comes to a point focus and is conveniently blocked by a small mask 45. An image-carrying diffracted-light beam 47 (similar to the object-modified beam 40 but a complex conjugate thereof) is directed back through the same cylindrical lenses used in constructing the hologram to reconstruct the initial wave front recorded. These lenses are spaced the same distance from the hologram 33' as they were from the hologram aperture 33 of FIG. 2 during hologram construction if the same light wavelengths are employed in both the construction and reconstruction steps. Since the same lenses are used, their imaging quality need not be maintained perfect. Any aberrations of these optical elements will be corrected upon reconstruction.

Figure 3:
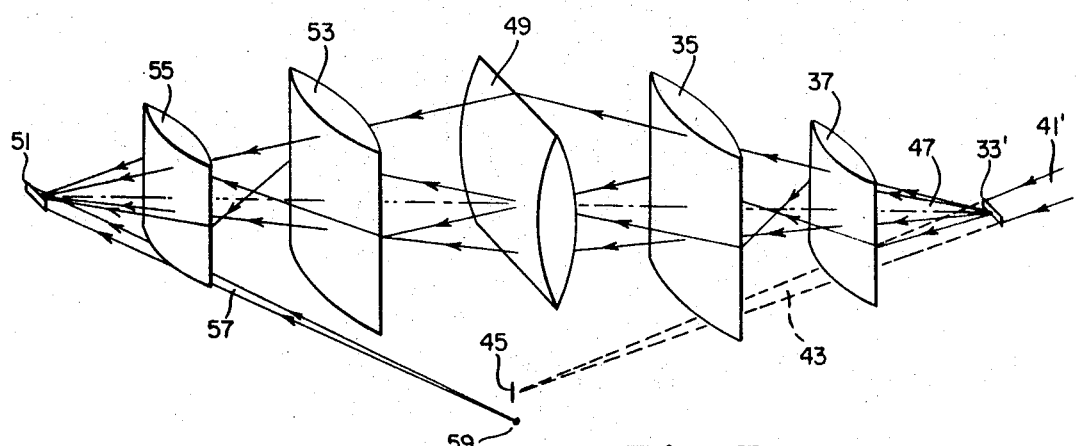
FIG. 3 illustrates a technique for copying a hologram constructed according to the technique of FIG. 2.

At about the location in real space where a pseudoscopic image (not shown) is brought to focus in the diffracted beam 47 of FIG. 3, a cylindrical lens 49 of good imaging quality is positioned to collect light in the vertical direction and direct it toward a copy hologram aperture 51. The lens 49 preferably does not affect the horizontal aspect of the diffracted image-carrying beam. In the horizontal direction, the reconstructed image is focused into hologram aperture 51 by cylindrical optics which may include, for instance, a pair of lenses 53 and 55 which are of wide aperture. These lenses perform the same function as the cylindrical lenses 35 and 37 used in making the original hologram. A diverging reference beam 57 of FIG. 3 preferably has a wave front curvature upon striking the hologram aperture 51 which makes it appear to have originated from a point source 59 that is located a distance from the hologram aperture 51 equal the distance between some points of an image (preferably in the middle thereof) reconstructed from the hologram 33' and the aperture 51. This is important for construction of a holographic movie which may be shown without the use of shutters or a pulsed laser. The reference beam 57 must be coherent with the reconstructing beam 41', which beams are most easily obtained from a single laser according to ordinary optical techniques. Furthermore, this light is most conveniently the same wavelength as that used to construct the hologram 33', but the cylindrical optics are insensitive to a change in wavelength.

Figure 4:
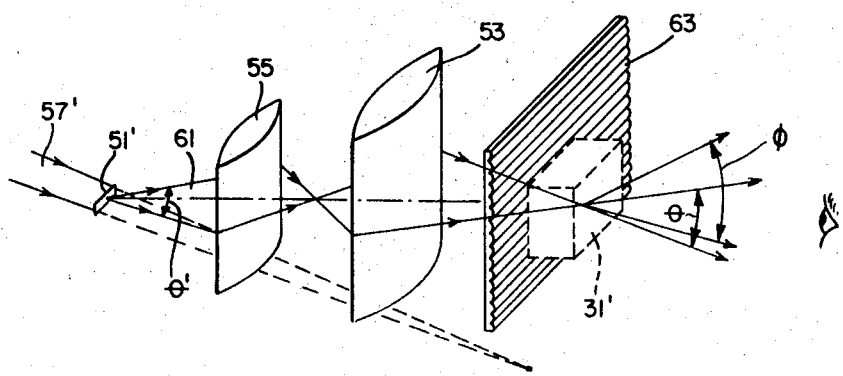
FIG. 4 illustrates the reconstruction of a hologram copied by the technique of FIG. 3.

After processing, the copy hologram 51' is illuminated as part of a holographic movie for reconstruction of an orthoscopic image 31' of the object 31, as shown in FIG. 4. The holographic 51' is illuminated with a reconstructing beam 57' which has an opposite wave front curvature than the reference beam 57 used in constructing the hologram. Furthermore, the reconstructing beam 57' strikes the hologram 51' on the opposite side from that which the reference beam 57 struck the hologram. An image-carrying first order beam 61 diffracted by the hologram 51' is directed back through the lenses 55 and 53, used in making the copy; to form an image 31' of the object 31. A lenticular screen 63 is positioned to pass through the space wherein the image 31' is formed. This screen is most conveniently made of some plastic material and has on one surface thereof a number of cylindrical elements (lenticles) extending in a horizontal direction and having dimensions in the vertical dimension of about 1 mm. so the audience will not clearly see them. The lenticular screen 63 does not affect the horizontal aspect of the image. The image focused on the screen 63 is sampled by each lenticular element and reprojected over a beam spread angle $\Phi$ that is wide enough to cover the entire audience. This beam spread is not directly obtained in the reconstructed beam 61 diffracted by the hologram because of the very thin vertical dimension of the hologram 51' which has been constructed without compensation therefor by vertical information data reducing optics such as is done with cylindrical optics in the horizontal direction. Even with use of the lenticular screen 63, the small vertical dimension of the hologram 51' does not provide three-dimensional information in the vertical direction of the image 31' but this is of little concern since an individual's eyes are horizontally displaced which results in depth perception in the horizontal dimension only. The image 31' as to its horizontal aspects is fully three dimensional.

When it is said that the same lenses 53 and 55 are used during reconstruction that were used in making the copy hologram now being viewed, it should be understood that in order to be able to show more than one copy simultaneously in more than one theater, other lenses must also be useable. These lenses are preferably formed from plastic by a molding process and it can be seen that for a given mold in constructing a number of such lenses that each lens will have substantially the same characteristics, including aberrations, as every other. Therefore, the cylindrical lenses used in reconstructing the hologram according to FIG. 4 should be constructed in the same manner as the lenses 53 and 55 used in making a hologram copy according to FIG. 3. This approach still results in the ability to use lenses which are not optically perfect since they will all have substantially the same aberrations and distortions and those introduced during the making of a copy will be eliminated during the reconstruction through similar lenses.

As has been noted with respect to FIG. 1, the horizontal angle of spread $\theta$ determines the number of people who can view the horizontal movie. Referring again to FIG. 4, it may be observed that from ordinary optical principles, the angle $\theta'$ which is the extent of the light diffracted by the hologram 51' is related to the angle $\theta$ by the power of magnification of the cylindrical lenses 53 and 55. That is, the ratio of the image width to the horizontal dimension of the hologram aperture is determined by the ratio $\theta'/\theta$. It can be seen, then, that for large image projections, the hologram 51' must similarly have a large horizontal extension. In certain applications, this limitation is undesirable and limits desirable data reduction. A technique without this restriction uses a dispersive medium (scatter plate) in combination with a cylindrical lens during the hologram construction for horizontal data reduction.

Figure 5:
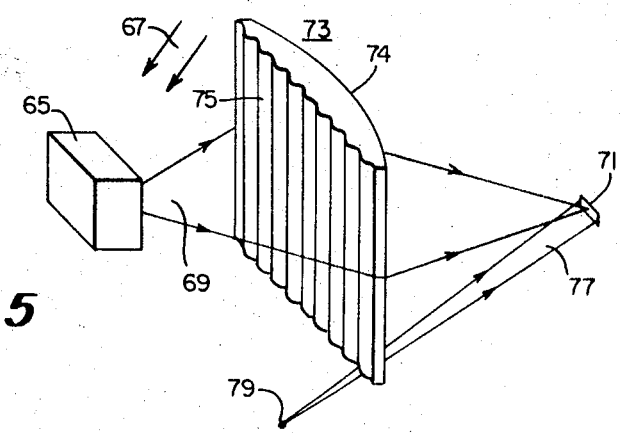
FIG. 5 shows the construction of a hologram according to another aspect of the present invention.

Referring to FIG. 5, an object 65 is illuminated with temporally coherent light 67 and reflects an object-modified beam 69 toward a hologram aperture 71. An optical element or elements is positioned in the path of the object-modified beam 69 and includes in tandem a two-dimensional dispersion medium which scatters light in horizontal directions only and a cylindrical lens which has curvature in the horizontal direction only. This horizontal data reduction is preferably performed by a single optical element 73 having a dispersion medium 75 on its incident surface and a cylindrical lens element 74 as part of its exit surface. The dispersion medium 75 preferred herein includes a structure which imparts to a light wave front passing therethrough a periodically varying phase thereacross in a horizontal direction with a substantially zero relative phase change across the wave front in a vertical direction. This result is preferably obtained by a dispersive medium in the form of periodic ridges and grooves (corrugations) scored into the face of the transparent optical element 73. The ridges and grooves occur periodically across the horizontal direction and are equally curved. The period is about 3 mm., depending on the light wavelength and the hologram construction geometry. The curves of the ridges and grooves in horizontal cross section are preferably parabolic sections in order to spread a beam of light over the desired angle with uniform intensity. Although a random ridge an groove shape is workable, it is not preferred because of the greater difficulty in realignment upon reconstruction and because of the wider angles through which some of the light is scattered.

As described in more detail in aforementioned copending patent application Ser. No. 809,171 copending application Ser. No. 875,768 filed Nov. 12, 1969, and in published papers of Kenneth A. Haines, the use of a dispersive medium in the path of the object-modified beam between the object and hologram detector "codes" the object-modified beam in a manner that reduces the spatial frequencies that the hologram must record and also reduces the hologram size necessary to record information about an image with a wide angle of view. An image-carrying beam reconstructed from the hologram carries this code, so it must be "decoded" by positioning therein a similar dispersive structure. The field of view of a decoded reconstructed image is the same as if the hologram detector had been placed in a plane of the dispersive medium and with its two-dimensional size. Of course, these principles are applied herein only to the horizontal aspect of the object information and the vertical aspect is unaffected by use of the dispersion medium herein.

The cylindrical lens portion of the optical element 73 bends dispersed object-modified light into the hologram aperture 71 for interference with a reference beam 77. The reference beam preferably has a wave front curvature to make this appear to have originated from a point source 79 substantially the same distance from the hologram aperture 71 as that distance between the aperture and the dispersive medium 75. Use of this preferred reference beam wave front curvature makes it easier to realign the optical element 73 when making a hologram copy.

Figure 6:
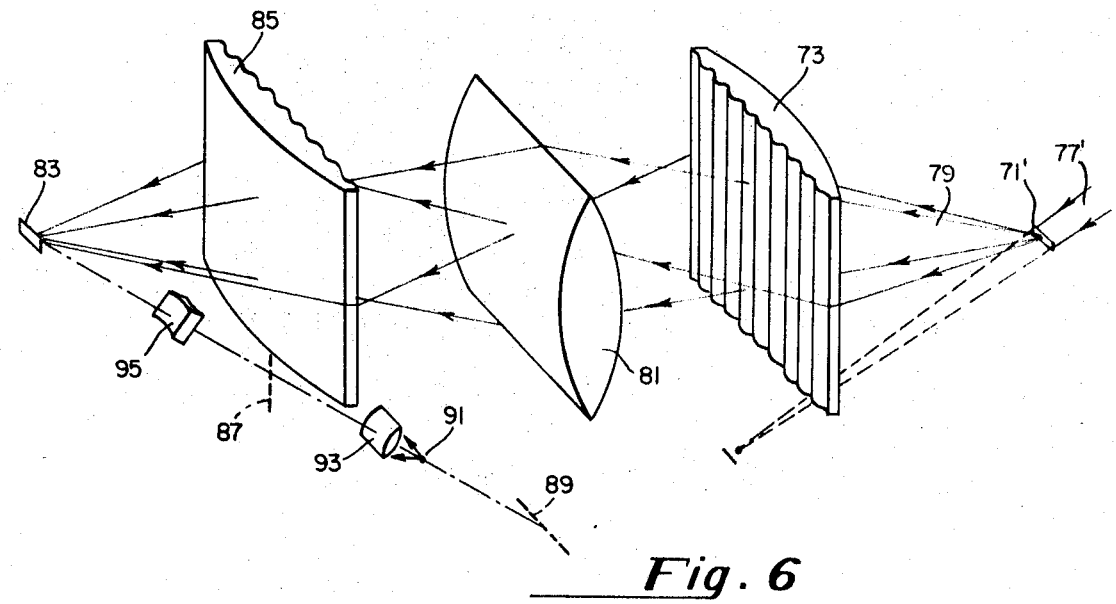
FIG. 6 illustrates a technique for copying a hologram made according to FIG. 5.

Referring to FIG. 6, a method of making a copy of the hologram 71' is shown. The hologram is illuminated with a reconstructing light beam 77' of opposite curvature as the reference beam 77 and striking the hologram from the side thereof opposite to the side exposed during its construction. The hologram diffracts a portion of the reconstructing light into a diffracted beam 79 which carries the image information. The diffracted beam is passed back through the optical element 73 located the same distance from the hologram 71' as it was located with respect to the hologram aperture 71 of FIG. 5. An image of the object is thereby reconstructed in substantially the same location relative to the optical element 73 as the object 65 was so located during the construction of the hologram. A cylindrical lens 81 of FIG. 6 is placed approximately at this image location for gathering the light in the vertical direction and directing it toward a copy hologram aperture 83. Another combination dispersion medium cylindrical lens optical element 85 modifies the light in the horizontal direction only before striking the hologram aperture 83.

The preferred reference beam for illuminating the hologram aperture 83 of FIG. 6 is one with a complex wave front curvature that appears to have originated form both a vertical line 87 and a horizontal line 89. The line 87 is located a distance from the aperture 83 which is substantially the same as the distance between dispersive corrugations of the lens 85 and the aperture 83. The horizontal line 89 is located a distance from the aperture 83 that is substantially equal to the distance between object points of the pseudoscopic image reconstructed from the hologram 71' and the aperture 83. Such a reference beam may be obtained by a number of specific optical combinations, one of which might utilize a point or apparent point source 91 located between the reconstructed pseudoscopic image and the optical element 85 with a cylindrical lens 93 also located therebetween. A negative lens 95 is then placed in the light beam between the optical element 85 and the hologram aperture 83. This arrangement allows both for continuous film transport during movie reconstruction without significant image movement and also simplifies the problem of repositioning the cylindrical optical element 85 during reconstruction.

Figure 7:
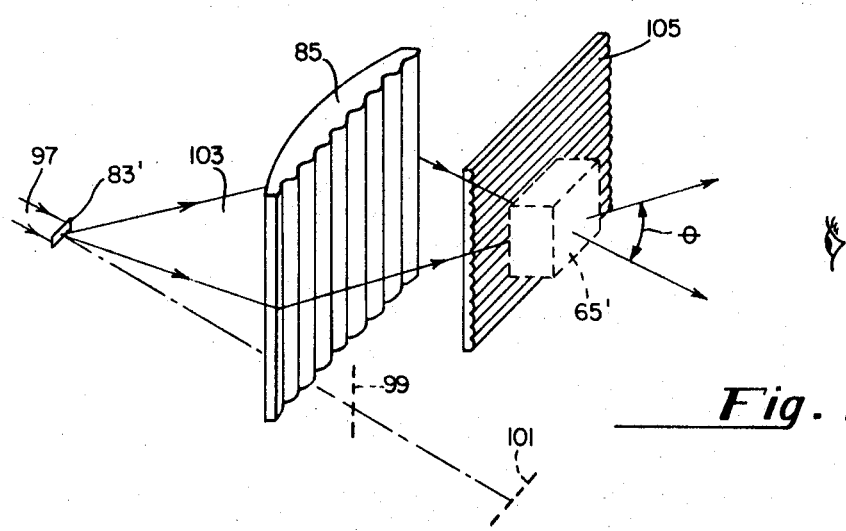
FIG. 7 shows the reconstruction of a hologram copied by the method illustrated in FIG. 6.

Referring to FIG. 7, a technique for reconstructing images from the copy hologram 83' is illustrated. A reconstructing light beam 97 is directed against the hologram 83' and has a wave front curvature which is the opposite of that of the reference beam which was used in constructing the hologram at the aperture 83. The reconstructing light beam 97 is given a complex wave front shape corresponding to that of the reference beam utilized in constructing the hologram. The reconstructing beam 97 is given a curvature to form a vertical focused line 99 and a horizontal focused line 101. An image-carrying beam 103 diffracted by the hologram 83' is directed back through the cylindrical optical element 85 to form an image 65' of the object 65. In order to increase the vertical spread of the image-carrying beam 103, a lenticular screen 105 having small horizontal cylindrical elements is positioned within the space occupied by the object image 65'. The cylindrical elements of the lenticular screen 105 should not affect the horizontal component of the image information and additionally should be small enough (about 1 mm.) so that the screen is not itself visible to the audience.

The holographic construction, copying and reconstruction techniques discussed with respect to FIGS. 5-7, respectively, have the advantage that larger images with wider viewing angles may be reconstructed from a given hologram size than in the methods described with respect to FIGS. 2-4. However, the methods of FIGS. 5-7 have a disadvantage that the cylindrical optical elements 73 and 85 must be carefully realigned during the copying and image reconstruction steps so that the corrugations making up the dispersive mediums are nearly exactly lined up with an image reconstructed thereof. This is not a serious disadvantage, however, if the corrugations 75 are periodically varying with a period of the order of a millimeter since realignment is not too difficult. Additionally, the techniques described with respect to FIGS. 5-7 require that the reconstructing light wavelength be more exactly that used in constructing the hologram if the same cylindrical optical element used in constructing the hologram is to be used in reading it out.

Figure 8:
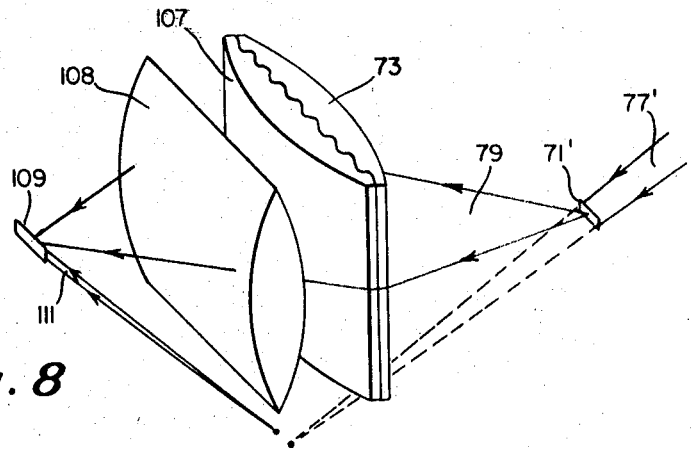
FIG. 8 shows an alternative method for copying a hologram constructed according to the techniques illustrates in FIG. 5.

Another disadvantage of the techniques illustrated with respect to FIGS. 5-7 is that the copy hologram 83' which is necessary to allow reconstruction of an orthoscopic image of the object, has been constructed with two dispersion mediums, one on each of the cylindrical optical members 73 and 85. Use of a dispersive medium is essentially a sampling process which throws away part of the image information. When this is done twice in series, an amount of information is lost that is a multiple of that information lost with a single-scatter plate. To eliminate this double sampling, and alternative to the copying configuration of FIG. 6 is to make a holographic copy capable of reprojecting the conjugate of the wave front projected by the original hologram just prior to leaving the scatter plate into the air. Such a technique is illustrated in FIG. 8 wherein the master hologram 71' is illuminated with a reconstructing beam 77' and an image-carrying diffracted beam 79 directed back through the cylindrical optical element 73, much as the initial steps of making a copy according to the technique illustrated in FIG. 6. In the specific embodiment of FIG. 8, the cylindrical lens element 73 is mated with a second cylindrical lens element 107 which has light-dispersing corrugations that perfectly match those of the cylindrical lens element 73. When the two cylindrical lens elements 73 and 107 are joined with a liquid gate therebetween to reduce light reflections, the combination performs merely like a cylindrical lens. No image sampling is accomplished by the combination. A copy hologram aperture 109 receives the image-carrying diffracted beam 79 after passing through the cylindrical lens element combination. An additional cylindrical lens 108 is generally desired to gather light in a vertical direction into the aperture 109. (Alternatively, two lenses may be provided, one on either side of the combination of lenses 73 and 107, to serve the function of lenses 108.) A reference beam 111 is also directed against the hologram aperture for making a hologram copy.

Figure 9:
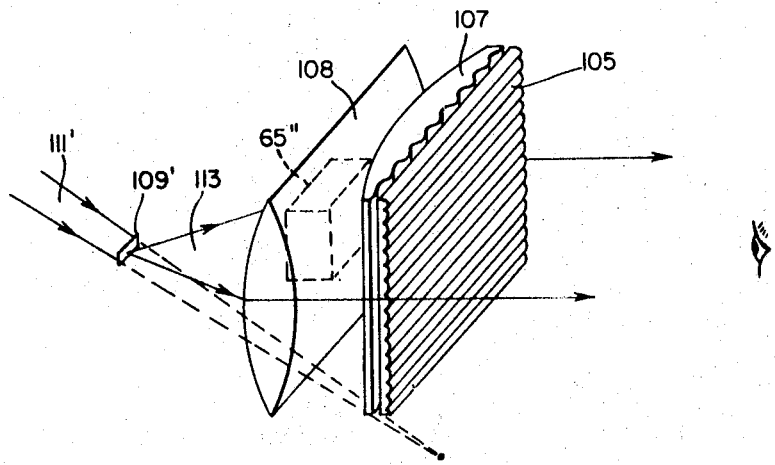
FIG. 9 shows the reconstruction of a copy hologram constructed according to the technique of FIG. 8.

The hologram copy 109' is reconstructed in a manner illustrated in FIG. 9 wherein a reconstructing light beam 111' has the opposite curvature of the reference beam 111 used in making the copy hologram. The hologram 109' diffracts a portion of the reconstructing light into an image-carrying diffracted beam 113 which is directed back through the cylindrical lens elements 107 and 108 with the cylindrical lens element 73 removed from contact therewith. The lens elements 107 and 108 are positioned the same distance from the hologram 109' during reconstruction (FIG. 9) as they were positioned relative to the aperture 109 (FIG. 8) during construction. An orthoscopic image 65'' of the object 65 is formed behind the cylindrical lens element from the observer. The image 65'' is reconstructed with less information loss than the image 65' reconstructed as shown in FIG. 7. In the reconstruction illustrated in FIG. 7, the image 65' is formed in behind the cylindrical lens element 85 from the observer by a significant distance so that an observer focuses his eye on a location in space removed from the noise of the dispersive corrugations of the cylindrical lens element. A disadvantage to the reconstruction illustrated in FIG. 9 is that the lenticular screen 105 is not conveniently placed in a location passing through the image 65''. Placing the lenticular screen 105 too far from the image results in distortions in the vertical aspect of that image which cannot be equally corrected for all locations within an auditorium wherein a holographic movie is to be displayed.

Figure 10:
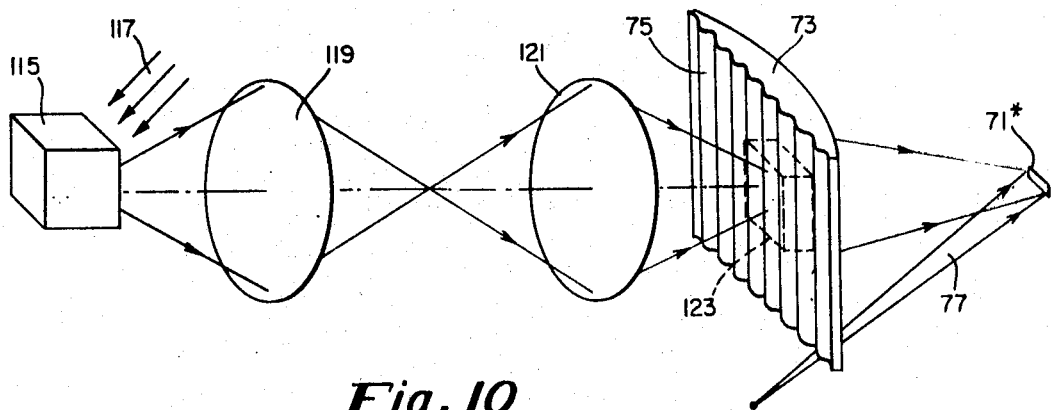
FIG. 10 illustrates a technique of constructing a hologram which is a modification of the technique illustrated in FIG. 5.

Although these disadvantages may not be serious for some particular applications, they may be corrected by making a hologram according to the configuration of FIG. 10. The distinction over the method illustrated with respect to FIG. 5 is that an object 115 illuminated with coherent light 117 is imaged into the cylindrical lens element 73 through its dispersive medium 75 by a high quality spherical optical system, such as one including in a telescope arrangement spherical lenses 119 and 121. These lenses must be of a very wide aperture which means that they should have a diameter of many feet in some circumstances. An image 123 projected into the cylindrical lens element by the spherical lenses 119 and 121 may be demagnified if desired. The demagnification should be only by a few times so that the depth distortion of the image 123 by such demagnification is not so severe as to be objectionable upon reconstruction. In any event, the image 123 can be placed wholly behind the corrugated surface 75 of the cylindrical lens element 73. A master hologram 71'' is then constructed and copied in the same manner as the hologram 71' was copied as illustrated in FIG. 8. Reconstruction of the copy hologram in the same manner as the hologram 109' is reconstructed according to FIG. 9 places an image the same size as the image 123 in front of the cylindrical lens element 107 so that the lenticular screen 105 may be placed through the image so that the observer focuses in front of the noise plane of the dispersive corrugations of the cylindrical element 107.

If the image 123 is focused in a position near the plane of the dispersive medium 75, certain other advantages result. The area of the dispersive medium 75 need not be so great as hereinbefore to construct a hologram capable of reconstructing an image with a given viewing angle. Additionally, a dispersive medium is easier to reposition than in the case where the object of the hologram is a larger distance from the dispersive medium.

It should be noted at this point that demagnification of the object scene into a smaller one may also be accomplished in the hologram construction techniques illustrated in FIGS. 2 and 5 by the use of high quality, large aperture cylindrical optics such as the lenses 119 and 121 illustrated in FIG 10. This modified technique then presents the demagnified object scene as the object of the hologram-constructing process. In reconstruction according to the techniques illustrated, the size of the reconstructed image will be the same as the image formed for the object of the hologram construction. That is, the holographically reconstructed image is a demagnified image of the original object scene. Additionally, if an object image 123 is formed in or near the dispersive corrugations 75 as shown, the area of the dispersion medium need not be so large to maintain a given viewing angle. Also, forming an object image 123 partially on the dispersive corrugations 75 makes it easier to reposition the dispersive medium upon reconstruction of the hologram.

Figure 11:
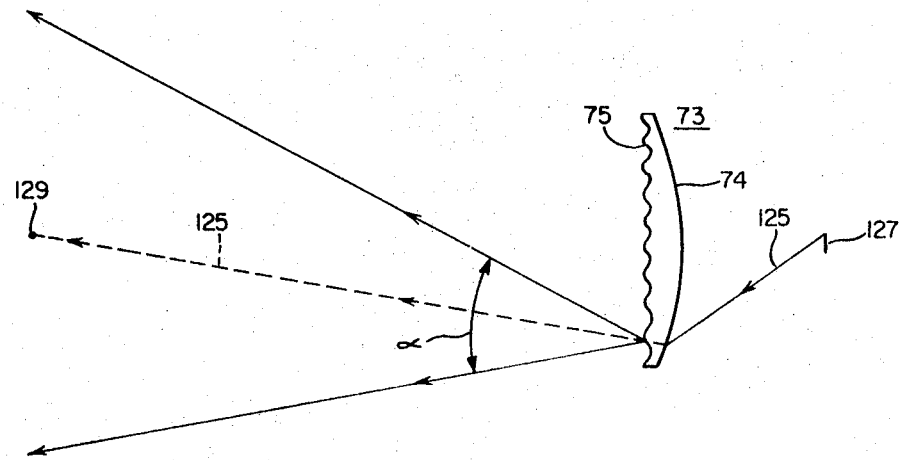
FIG. 11 demonstrates the requirements of an optical element of the type utilized in FIGS. 5–10.

Referring to FIG. 11, the characteristics desirable of a cylindrical lens element utilized in the embodiments of the invention illustrated with respect to FIGS. 5-10 is shown. The cylindrical lens element 73 with corrugated surface 75 is shown in plan view but discussion relating thereto is equally applicable to the cylindrical lens element 107 which is the mate of the lens element 73. The lens power of the surface 74 is chosen to be sufficient to bend a ray 125 coming from the holographic movie 127 into a point of the audience 129 in its middle and somewhere toward, but not exactly at, its rear. The corrugations 75 are chosen with depth and period to scatter such a light ray through an angle $\alpha$. It is this requirement for placing most of the audience in the horizontal field of view of the reconstructed image that determines the character of the cylindrical lens element used in constructing the holograms. The lens element 73 is most easily made from plastic which has been cast in a mold carefully constructed with the desired surfaces.

Alternative to the combination cylindrical lens and dispersive medium shown herein is a dispersive medium alone with unequal ridges and groves in order to perform a light bending as well as scattering function with the bending power greatest near the edges. Such structure should have an equivalent light bending and scattering capability as the cylindrical lens dispersive medium combination illustrated in FIG. 11.

Figure 12:
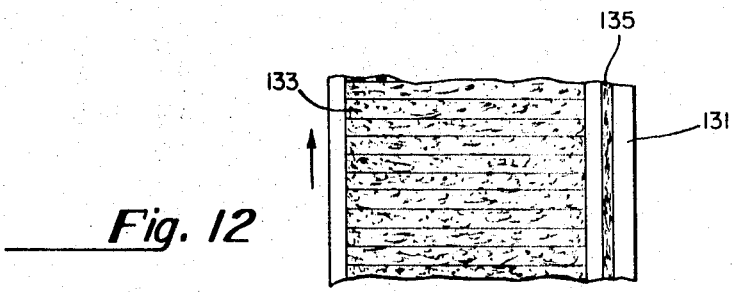
FIG. 12 shows a preferred configuration of individual holograms on a hologram movie.

Most of the discussion herein has dealt with construction, copying and reconstructing of a single hologram. Such a hologram is constructed many times each second for inclusion on a continuous length high-resolution photographic film in a manner such as that illustrated in FIG. 12. The photographic film 131 may have these individual holograms arranged in any number of ways but for relatively small size images, somewhere in the range of 5 to 10 feet in width, it is most convenient to use a photographic film 131 which is 90 mm. in width and which contains a number of narrow holograms, such as the hologram 133 approximately 75 mm. in width and only a few millimeters in height. Each hologram just touches those on either side of it in order to prevent light flicker as the holographic movie is shown by continuous film motion. Also on such a holographic movie is a soundtrack 135 which may be a conventional movie soundtrack or one holographically recorded according to the techniques described in a copending patent application Ser. No. 884,286, filed Dec. 11, 1969 by Daniel S. St. John, entitled, "Continuous Holographic Information Recording." For larger reconstructed images, a larger individual hologram size may be necessary which thus requires either a wider film or a rearrangement of the holograms from that shown in FIG. 12.

Figure 13:
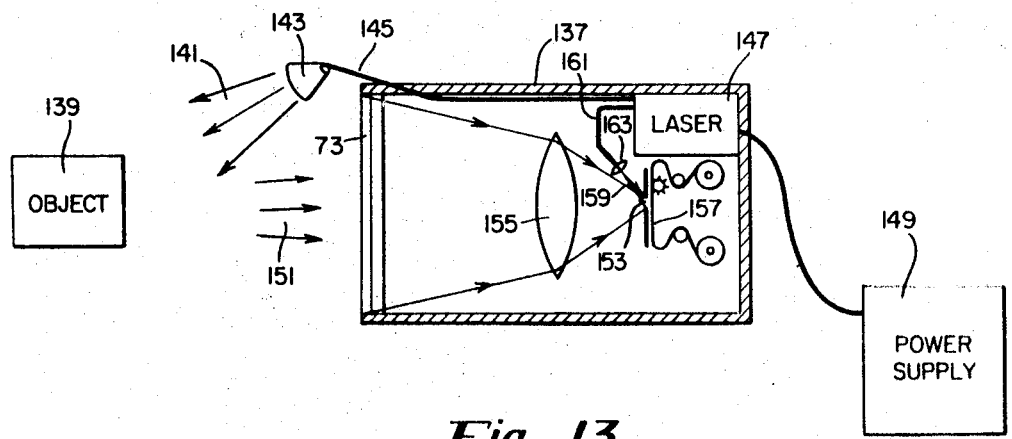
FIG. 13 shows the essential elements of an apparatus for constructing a holographic movie according to the techniques of this invention.

FIG. 13 illustrates the essential elements of a holographic movie camera for constructing a series of holograms according to the techniques hereinabove described. A suitable enclosure 137 contains at one end thereof the cylindrical lens element 73. An object 139 is illuminated by coherent light 141 emitted from a diffuser 143 which is connected by an optical path 145 to a high-powered pulsed laser 147. The optical path 145 may be a series of reflective surfaces such as mirrors or a bundle of optical fibers which carry light from the laser to illumination of the object. The laser is supplied with power and coollant from a power supply 149. Object-modified light 151 is directed into a hologram aperture 153 by the cylindrical lens element 73 and a second cylindrical lens element 155 which affects only the vertical aspect of the object-modified information passing therethrough. The lens 155 is an element which has not been illustrated hereinabove but is optional as a means for gathering light into the very small vertical dimensions of the hologram aperture. If such a lens is used, it should also be placed between the cylindrical lens element 73 and the master hologram for making a copy. However, such a lens need not be included in the projection of a copy hologram. Its advantage is to reduce somewhat the intensity with which the coherent light must illuminate an object.

The laser is pulsed at periodic intervals something in excess of 10 times per second and synchronized therewith is a mechanical movement (not shown) which advances a high-resolution photographic film 157 an amount something more than the height of the hologram aperture 153 between laser pulses. This combination therefore provides the necessary shuttering effect. A reference beam 159 illuminates the hologram aperture 153, and thus the film 157, to construct a hologram. The reference beam 159 is generated by an optical path 161 illuminating a diverging lens 163. The optical path 161 may again be optical fibers or a series of mirrors and should include a delay line arrangement (not shown) of some suitable design so that the light path from the lasing element of the pulsed laser to the hologram aperture is the same through the reference beam light path 161 as it is through the object-illuminating beam light path 145, to the object, and back through the camera optics to the hologram aperture 153. Such compensation reduces the strict requirements of temporal coherence of a suitable laser source.

In the construction of holographic movies, the individual holograms need not be immediately adjacent one another since in the copying processes described hereinabove, each hologram is carefully positioned to be copied and may then be positioned adjacent one another as eventually required for the copy film.

It may also be noted that neither the size of the hologram nor the type of photosensitive detector material need be the same for the original and copy holograms. In constructing the first hologram from a real life object, a fast photosensitive material is preferred because only a low light intensity is usually available to expose the detecting material. However, in constructing a second hologram from the first, the available light intensity may be made greater, thereby allowing use of a slow photosensitive copy detecting material with better resolution capability.

Figure 14:
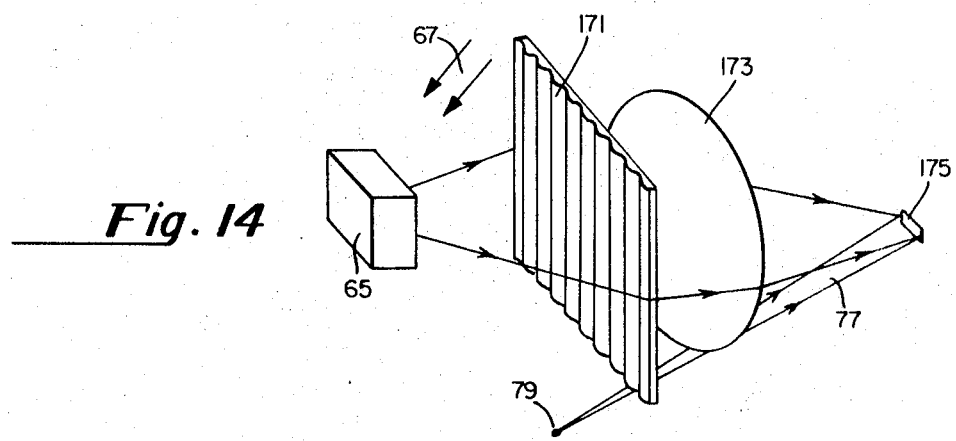
FIG. 14 shows the construction of a hologram in a manner similar to FIG. 5 but with the use of spherical optics.
Figure 15:
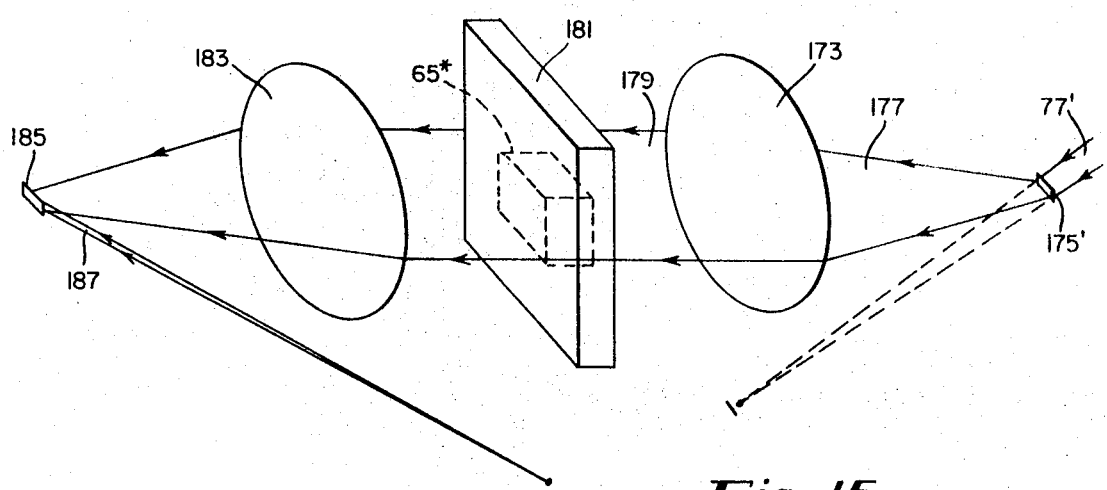
FIG. 15 shows the copying of a hologram constructed according to FIG. 14.
Figure 16:
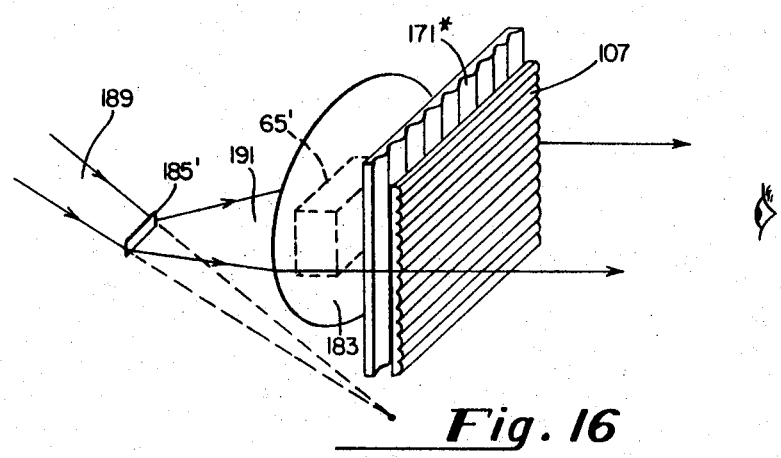
FIG. 16 shows the reconstruction of a copy hologram formed according to the technique of FIG. 15.

Cylindrical optical elements are preferred to accomplish signal processing as described hereinbefore because they are less sensitive to repositioning in an image field than are spherical lenses. However, under certain circumstances spherical lens elements may be convenient. In FIGS. 14, 15 and 16, spherical lenses are utilized in optical systems which are the counterparts, respectively, of the cylindrical systems of FIGS. 5, 8 and 9. Referring to FIG. 14, a hologram construction technique is shown which differs from that of FIG. 5 in that a scatter plate 171 and a spherical lens 173 replace the cylindrical optical element 73 of FIG. 5. The spherical lens 173 is positioned relative to a hologram aperture 175 so that the aperture is approximately at the focal point of the lens 173. This position will generally provide maximum light reconstructed from a hologram copy to an area occupied by the audience.

FIG. 15, the hologram 175' is illuminated with a reconstructing-light beam 77' which is a complex conjugate of the reference beam 77. A diffracted beam 177 is passed back through the spherical lens 173 located the same distance from the hologram 175' as it was from the hologram aperture 175 of FIG. 14. A beam 179 carrying a pseudoscopic image 65* is passed through a flat block of optical material 181 in order to adjust the optical path length to compensate for an omitted dispersion medium. The beam 179 then passes through another spherical lens 183 which directs light onto a second hologram aperture 185 for recording a copy hologram 185' by interference with a reference beam 187.

Referring to FIG. 16, the hologram 185' reconstructs an orthoscopic image 65' of the object 65 upon illumination with a reconstructing light beam 189 that is the complex conjugate of the reference beam 187 used in constructing the hologram. The orthoscopic image 65' is formed in a diffracted beam 191 which is passed back through the lens 183 positioned the same distance from the hologram 185' as the lens 183 was positioned from the hologram aperture 185 in FIG. 15. A diffracted beam is then passed through a dispersion medium 171* which is positioned with respect to the hologram 185' coincident with an image of the dispersion medium 117, thereby to cancel out its effect. After the effect of the dispersion medium is removed, the orthoscopic image 65' becomes viewable in the diffracted beam 191 which is then passed through a lenticular screen 105 to spread out the image-carrying beam in a vertical direction to cover a large audience.

In all the embodiments of the present invention described herein, a hologram significantly smaller than the object scene has been recorded which maintains horizontally a wide angle of view of reconstructed images having full three-dimensional characteristics. A lens or dispersion medium element is utilized for acting only on the horizontal aspect of the object scene recorded. No such element is utilized in processing the vertical aspect of the object information prior to recording the hologram. The vertical aspect is defocused intentionally on a hologram aperture during construction in order to maintain all points of the image stationary during reconstruction, at least within a distance equal to the hologram vertical dimension, as the hologram is drawn at a uniform velocity in its vertical direction through an effectively continuous coherent reconstructing light beam. A wide viewing angle in the vertical direction is obtained by use of a lenticular screen having cylindrical lenticles oriented in a horizontal direction. Reconstructed image three dimensionality in a vertical direction is lost by such a technique but this is of little concern for playing to an audience that can detect three dimensionality primarily in the horizontal direction.

It shall be understood that the invention is not limited to the specific arrangements shown, and that changes and modifications may be made within the scope of the appended claims.

What is claimed is:

1. A method of constructing a hologram, comprising the steps of:
    illuminating an object scene with coherent light to produce an object-modified wave front,
    positioning to intercept the object-modified wave front an elongated hologram detector having a horizontal dimension much greater than its vertical dimension but many times smaller than said object scene,
    processing horizontal components of the object-modified wave front independent of and different from its vertical components prior to said wave front striking said detector, and
    directing coherent reference radiation toward said hologram detector for interference with the processed object-modified wave front to generate holographic information of said object scene for recordation as a hologram.

2. The method of constructing a hologram according to claim 1 wherein said step of processing the horizontal components of the object-modified wave front includes focusing horizontal aspects of the object scene into the horizontal dimension of the hologram detector.

3. The method according to claim 2 wherein said focusing is accomplished by positioning cylindrical lenses in said object-modified wave front between the object scene and the hologram detector.

4. A method of constructing a hologram according to claim 1 wherein the step of processing the horizontal component of the object-modified wave front includes dispersing rays of said wave front substantially only in horozontal planes.

5. A method of constructing a holographic movie wherein successive independent holograms are constructed according to the method of clam 1 along an elongated photosensitive material.

6. A method of reconstructing an object scene image from holographic information recorded according to the method of claim 1, which includes the steps of:
generating a diffracted light order from said holographic information in a manner that allows formation of an orthoscopic image of the object scene in real space,
forming said real space orthoscopic image by processing horizontal components of the diffracted light order, and
dispersing light rays of said diffracted light order in vertical planes in a manner to increase the beam spread of the diffracted light order in its vertical direction.

7. A method according to claim 6 wherein the step of dispersing said light rays in vertical planes includes placing within said real space orthoscopic image a lenticular screen.

8. In a method of constructing a hologram characterized by directing to a hologram detector at a finite angle with each other for interference thereon both an object-information-carrying light wave front and a reference light wave front, the improvement comprising the steps of:
dispersing said object-information-carrying light wave front at a surface thereacross substantially only in planes extending horizontally across the object information wave front, and
converging said object-information-carrying light beam in a horizontal direction onto a hologram-detecting area which has a horizontal dispersion that is at least several times smaller than the horizontal extent of said surface at which said object-information-carrying beam is horizontally dispersed.

9. The method according to claim 8 wherein the step of dispersing the object information wave front includes imparting to said wave front a substantially periodic relative phase across said surface in a horizontal direction but substantially without relative phase variation in a vertical direction thereacross.

10. The method according to claim 8 wherein the step of dispersing said object-information-carrying wave front includes positioning of said surface thereacross a refracting interface having periodically recurring peaks and valleys across a horizontal direction thereof but without variation in a vertical direction. positioning at said surface thereacross a refracting interface having periodically recurring peaks and valleys across a horizontal direction thereof but without variation in a vertical direction.

11. The method according to claim 8 wherein the steps of dispersing and converging said object information beam are accomplished by positioning within the path of said object-information-carrying light wave front a lens element shaped by its surfaces to both converge and disperse said wave front.

12. The method according to claim 8 wherein the vertical dimension of the hologram is many times smaller than it horizontal dimension.

13. A method of reconstructing an image from a hologram constructed according to claim 12, comprising the steps of:
generating from said hologram a diffracted light order wave front,
dispersing rays of said diffracted light order wave front in horizontal planes in a manner to neutralize the coding effect of such dispersion during construction of the hologram, and
dispersing rays of said diffracted light order wave front in vertical planes in a manner to expand the vertical beam spread of said diffracted light order wave front.

14. The method of reconstructing an image according to claim 13 wherein the step of dispersing rays in vertical planes includes placing a dispersion structure across said wave front at a location where an object image comes to focus in real space, said structure accomplishing substantially no dispersion in horizontal planes.

15. A method of holographically reconstructing an image of an object comprising the steps of:

illuminating said object with coherent light to produce an object-modified wave front,
positioning to intercept the object-modified wave front a horizontally elongated detector many times smaller than said object,
positioning in said object-modified beam before striking said detector data reducing optics which affect substantially only the horizontal aspect of the object-modified wave front,
directing at said hologram a reference beam to interfere with said horizontally data reduced object-modified beam,
illuminating said detector with a reconstructing light wave front having a curvature in substantially the opposite direction of the curvature of said reference beam, thereby producing an image-carrying diffracted beam, and
repositioning in said diffracted beam an optical system with substantially the same characteristics as said data-reducing optics in a manner to produce a pseudoscopic image of said object in real space.

16. A method according to claim 15 wherein the step of positioning data-reducing optics includes positioning at least one cylindrical optical surface in said object-modified beam.

17. A method according to claim 15 wherein the step of positioning data-reducing optics includes positioning in said object-modified beam a dispersion medium that scatters light in substantially horizontal directions only.

18. A method of constructing a hologram copy of a hologram from which an object image is reconstructed according to the method of claim 15, comprising the steps of:
positioning in said image-carrying diffracted beam a horizontally elongated copy detector many times smaller than said object,
positioning copy-data-reducing optics in said image-carrying diffracted beam prior to striking said horizontally elongated copy detector, said copy-data-reducing optics affecting substantially only the horizontal aspect of the object-modified wave front, and
directing toward the copy detector a reference beam which is coherent with said reconstruction radiation beam, thereby to construct a copy of said hologram capable of reconstructing an orthoscopic image of said object.

19. A method of reconstructing an orthoscopic image of said object from a copy hologram constructed according to the method of claim 18, comprising the steps of:
illuminating said copy hologram with a reconstructing wave front having a curvature opposite in direction to the curvature of said copy reference beam, thereby producing an orthoscopic image-carrying diffracted-light beam,
positioning in said orthoscopic image-carrying diffracted-light beam on optical system having substantially the same characteristics as said copy-data-reducing optics, thereby producing an orthoscopic image of the object in real space, and
positioning in or near said orthoscopic reconstructed image a dispersion medium characterized by a plurality of substantially cylindrical elements horizontally oriented.

20. A system of large screen holographic movie projection, comprising,
a continuous wave laser generating a beam of coherent light,
a film transport capable of advancing a holographic movie at a uniform speed through said coherent light beam, thereby to generate an image-carrying-diffracted beam from the movie,
a cylindrical optical system positioned relative to said laser and said film transport to be located in the path of the diffracted beam and characterized by affecting substantially only the horizontal aspect of said beam, and
a dispersion medium positioned to be located in the path of the diffracted beam and characterized by affecting substantially only the vertical aspect of said beam.

21. A system according to claim 20 wherein said dispersion medium includes a lenticular screen having horizontally elongated cylindrical elements.

22. A system according to claim 20 wherein said cylindrical optical system includes a second dispersion medium which effects substantially only the horizontal aspect of said beam.

23. A system for constructing a holographic movie, comprising,
a high-powered pulsed laser for illuminating a large object scene, thereby to generate an object-modified beam,
a film transport which advances between pulses of said laser a photosensitive continuous film material positioned behind a hologram aperture having a horizontal dimension many times its vertical direction, and
a cylindrical lens system positioned to receive the object-modified beam for data reduction in the horizontal direction independent of the vertical direction.

24. A system according to claim 23 wherein said cylindrical lens system includes a dispersion medium for scattering rays of said object-modified beam in horizontal planes.

25. A system according to claim 23 which additionally comprises a cylindrical lens positioned in said object-modified beam to gather light in the vertical direction.

* * * * *

PO-1050
(5/69)

UNITED STATES PATENT OFFICE
CERTIFICATE OF CORRECTION

Patent No. 3,625,584          Dated December 7, 1971

Inventor(s) Daniel S. St. John

It is certified that error appears in the above-identified patent and that said Letters Patent are hereby corrected as shown below:

Column 1, line 52, a parenthesis "(" is missing before the word June.

Column 2, line 31, correct the spelling of the word "hologram".

Column 3, line 62, correct the spelling of the word "illustrated".

Column 7, line 12, delete the word "an" and insert the word --and--;
       line 67, correct the spelling of the word "from".

Column 8, line 60, delete the word "and" and insert the word --an--.

Column 9, line 8, delete the word "lenses" and insert the word --lens--.

Column 12, line 75, correct the spelling of the word "horizontal".
IN THE CLAIMS:
Column 13, line 3, correct the spelling of the word "claim";
       line 30, delete the word "dispersion" and insert the word --dimension--;

line 42 delete from the word "of" down to line 45 ending with the word "positioning".

Column 14, line 51, correct the spelling of the word "an".

Signed and sealed this 6th day of June 1972.

(SEAL)
Attest:

EDWARD M. FLETCHER, JR.          ROBERT GOTTSCHALK
Attesting Officer                 Commissioner of Patents